US010211712B2

(12) United States Patent
Laskaris et al.

(10) Patent No.: US 10,211,712 B2
(45) Date of Patent: Feb. 19, 2019

(54) GEOMETRY OF ROTOR END RING AND STATOR END TURNS

(71) Applicant: Tesla Motors, Inc., Palo Alto, CA (US)

(72) Inventors: Konstantinos Laskaris, San Mateo, CA (US); Andrew D. Baglino, San Francisco, CA (US)

(73) Assignee: TESLA, INC., Palo Alto, CA (US)

( * ) Notice: Subject to any disclaimer, the term of this patent is extended or adjusted under 35 U.S.C. 154(b) by 468 days.

(21) Appl. No.: 14/947,333

(22) Filed: Nov. 20, 2015

(65) Prior Publication Data

US 2016/0156256 A1 Jun. 2, 2016

Related U.S. Application Data

(60) Provisional application No. 62/086,170, filed on Dec. 1, 2014.

(51) Int. Cl.
*H02K 15/00* (2006.01)
*H02K 17/16* (2006.01)

(52) U.S. Cl.
CPC ......... *H02K 17/16* (2013.01); *H02K 15/0012* (2013.01)

(58) Field of Classification Search
CPC .......... H02K 1/26; H02K 1/265; H02K 17/16; H02K 17/165; H02K 2213/03; H02K 15/0012
USPC ........ 310/211, 216, 111, 261.1; 29/596, 597, 29/598
See application file for complete search history.

(56) References Cited

U.S. PATENT DOCUMENTS

| | | | |
|---|---|---|---|
| 7,579,725 B2 | 8/2009 | Zhou et al. | |
| 8,543,365 B1* | 9/2013 | Petro | H02K 21/12 703/1 |
| 8,692,435 B2* | 4/2014 | Sawahata | H02K 17/165 310/211 |
| 8,963,394 B2* | 2/2015 | Buttner | B22D 19/0054 310/211 |
| 9,866,095 B2* | 1/2018 | Jung | H02K 17/165 |
| 2010/0141080 A1 | 6/2010 | Tang | |
| 2011/0062819 A1 | 5/2011 | Lyons et al. | |
| 2014/0049134 A1* | 2/2014 | Koka | H02K 17/205 310/211 |

(Continued)

FOREIGN PATENT DOCUMENTS

JP 2007259526 A 10/2007
JP 2008154319 A 7/2008

(Continued)

*Primary Examiner* — Jeremy Luks
(74) *Attorney, Agent, or Firm* — Garlick & Markison; Bruce E. Garlick

(57) ABSTRACT

A method of making an AC induction motor includes: providing a rotor and a stator for the AC induction motor; determining, for different geometries of an end ring of the rotor, a location of a first centroid of current density in the end ring; determining, for end turns of the stator, a location of a second centroid of current density in the end turns; selecting a geometry for at least the endring of the rotor so that an axial distance between the first centroid of current density and the second centroid of current density is minimized; and assembling the AC induction motor, wherein the end turns and the end ring have the selected geometries.

10 Claims, 3 Drawing Sheets

(56) References Cited

U.S. PATENT DOCUMENTS

2014/0252910 A1  9/2014  Kunihiro et al.
2014/0339950 A1  11/2014  Nelson et al.

FOREIGN PATENT DOCUMENTS

JP   2011211789 A     10/2011
JP   2013223391 A  *  10/2013

* cited by examiner

GEOMETRY OF ROTOR END RING AND STATOR END TURNS

CROSS-REFERENCE TO RELATED APPLICATION

This application claims the benefit of the filing date of U.S. provisional application 62/086,170, filed Dec. 1, 2014 and entitled GEOMETRY OF ROTOR END RING AND STATOR END TURNS, the contents of which are hereby incorporated herein by reference.

BACKGROUND

Electric motors are used in a number of different contexts. Generally, an electric motor consists of a rotor and a stator inside a housing. Both the rotor and stator can include copper or another conductive material. For example, the stator can have copper end turns and the rotor can have a copper end ring. Both of these copper components generate excitation when the motor is operating. Some amount of magnetic flux from the copper parts is subject to leaking, meaning that the magnetic flux lines do not close inside the active part of the motor. Flux lines that close in non-active parts of the motor do not contribute to the torque of the motor. Particularly, when the motor is operating at high speed (i.e., a high frequency) the leakage can reduce the motor's power. From an electromagnetic perspective, the flux leakage is not necessarily considered a loss, but it makes the motor effectively smaller, which is undesirable.

DETAILED DESCRIPTION

This document describes systems and techniques that can be used in designing and manufacturing components of electric motors. Particularly, geometries for rotor end ring and stator end turns can be chosen in a way that improves performance or other characteristics of the motor.

Figure 1:
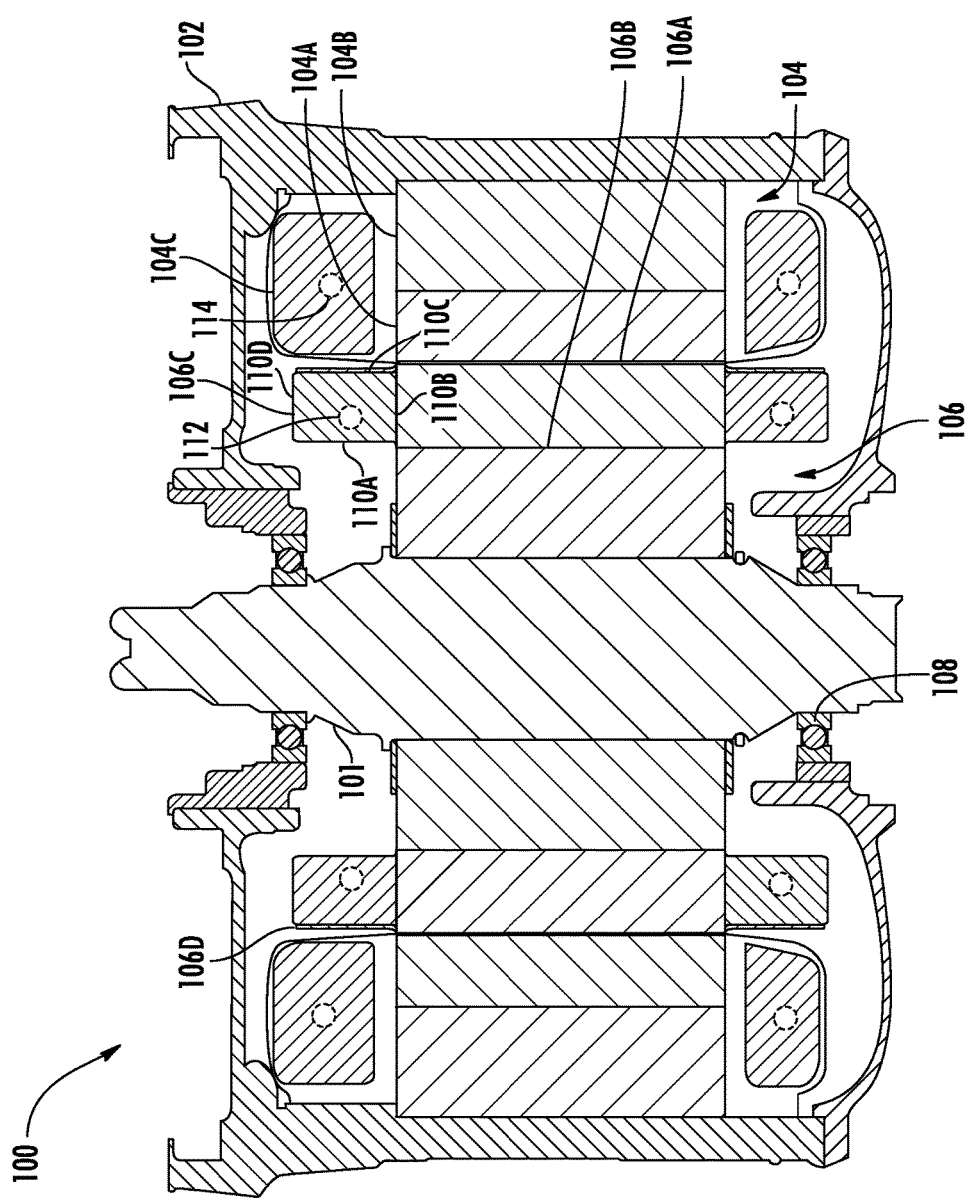
FIG. 1 shows an example cross section of an electric motor with a rectangular rotor end ring.

FIG. 1 shows an example cross section of an electric motor 100 with a rectangular rotor end ring. Here, the cross section is taken along the axis of the motor's shaft 101, which can be connected to a gearbox or to another driven component, which are not shown for clarity. The motor is contained within a housing 102, which can be made from aluminum. Held inside the housing are a stator 104 and a rotor 106. Here, the stator includes a portion 104A, a core portion 104B and end turns 104C. The rotor here includes a portion 106A, a core portion 106B, end rings 106C and containment rings 106D. The core portions 104B and 106B are made from a highly magnetically permissive material, such as steel. The portions 104A and 106A can be made from sparse iron, such as by placing copper bars in slots formed between teeth of iron. For example, the rotor 106 can be made by forming a stack of steel laminates.

The stator end turns 104C and the rotor end rings 106C can be made from copper, for example, or another conductive material. In some implementations, the containment ring 106D is made of a hardened material can serve to prevent or reduce the deformation of the rotor end ring 106C that may occur due to centrifugal force during rotation.

The rotor 104 is mounted on the shaft, which is suspended by bearing inserts 108 that in this example are held by a part of the housing 102.

In this implementation, the rotor end ring 106C has a substantially rectangular cross section. That is, the end ring is defined in a radial direction by surfaces 110A and 110C that are essentially parallel to each other. In an axial direction, moreover, the end ring is defined by surfaces 110B and 110D that are also essentially parallel to each other. In this example, the end ring is attached to the rotor by way of the surface 110B.

The stator end turns 104C, moreover, have a substantially rectangular cross section in this example. In other implementations, however, the end turns may have another shape.

When the motor is being used, a magnetic field will induce an electric current in the rotor, including in the rotor end ring, as is known. The distribution of current may not be constant over the cross-section profile of the end ring, however. Rather, the current can be distributed in some way so that for every area element of the cross section it can be defined what the density of electric current is at that area element. The geometry of the rotor end ring 106C can at least partly define this distribution. As an example, for any given end ring, one can determine what the current density is everywhere on the cross-section profile. For example, the determination can be made by simulating the current flow in a computer model, taking into account the applicable laws of electricity.

The current density can be greater in certain areas than in others. For example, the current distribution can have a maximum somewhere on the cross-section profile, indicating where the current density is the greatest. Such a maximum is sometimes referred to as a centroid of current density.

On the rotor end ring 106C a centroid 112 of current density has here been marked. The precise location of the centroid is an example only, and in some implementations the maximum current density can be located elsewhere on the cross-section profile. Nevertheless, the centroid indicates where the current density is the greatest in the example of this particular end ring shape. The current-density centroid does not necessarily coincide with a center of mass as determined over the cross-section profile area.

In the stator end turns 104C, moreover, a centroid 114 of current density can be determined, by the location of the total Amperturns in the cross section area. For a given time snapshot, for each mechanical angle, the total Amperturn value (the integral of current density on the entire end-turn cross-section) is sinusoidally distributed spatially over the circumference. The centroid of current density can be defined similarly to the rotor end-ring case.

In this example, the axial distance of the centroid 112 from the rotor 106 is similar to the axial distance of the centroid 114 from the stator 104. In some implementations, one or more aspects of motor geometry can be selected taking into account these axial distances. For example, the rotor end ring geometry can be selected so as to minimize the axial separation between the centroid 112 and the centroid 114.

Figure 2:
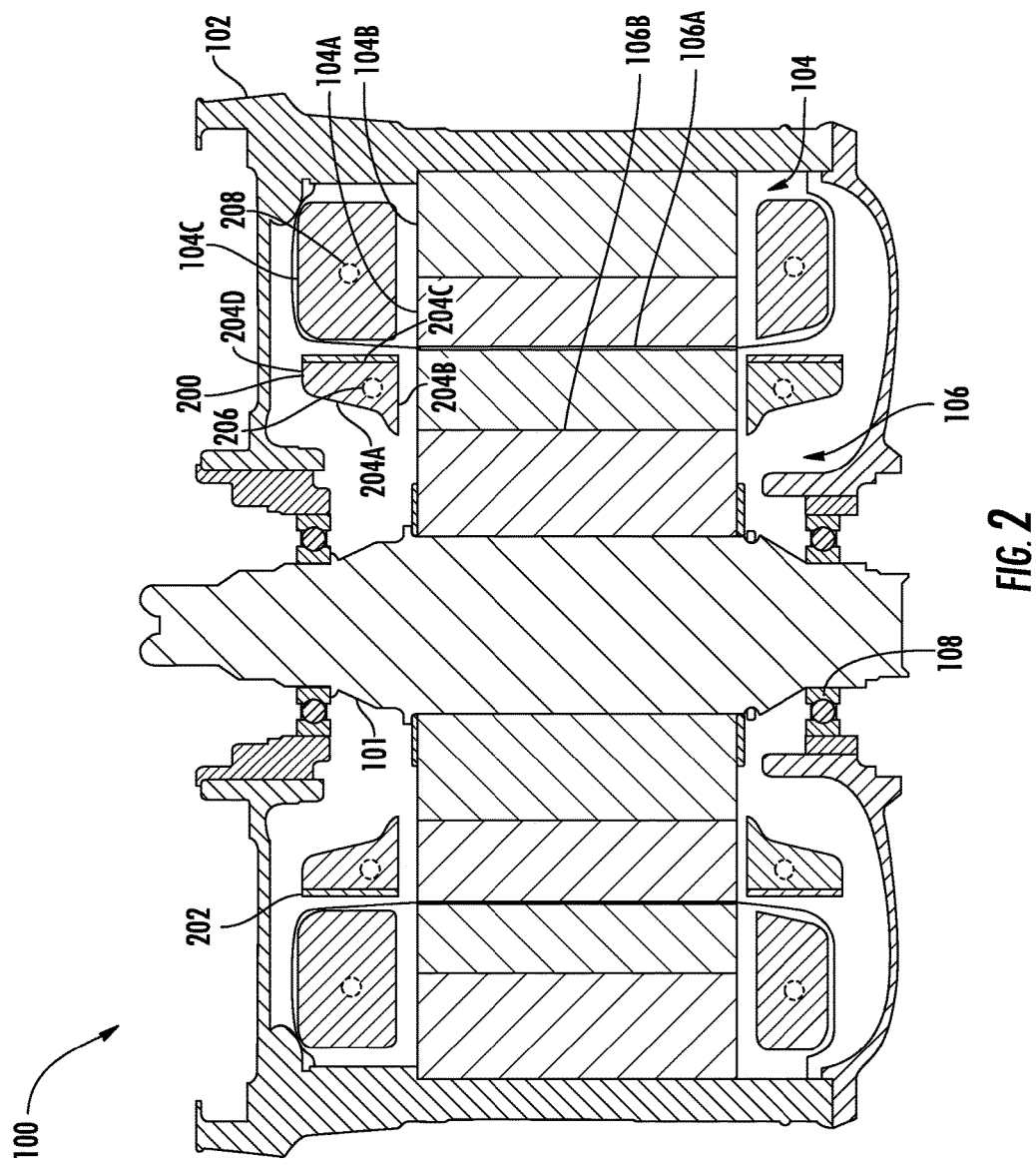
FIG. 2 shows an example cross section of the electric motor in FIG. 1 with another rotor end ring.

FIG. 2 shows an example cross section of the electric motor 100 in FIG. 1 with another rotor endring. Elements that are similar to those described above are labeled with the same reference numbers and are not explicitly mentioned anew. In this example, the rotor 106 has a rotor end ring 200 and a containment ring 202. In this implementation, the end ring is spaced apart from the rotor 106. That is, the surface 204B is not in direct contact with the portion 106A of the rotor. For example, a ring-shaped spacer can be placed between the rotor and the end ring.

The shape of the cross-section profile of the end ring 200 as shown here is sometimes referred to as a grand piano shape. Particularly, the end ring is defined by a surface 204A with a slanted portion, surfaces 204B and 204D that are essentially planar in a radial direction, and by a surface 204C that is essentially planar in a radial direction. The surface 204A can have any of a number of shapes. In some implementations, the surface 204A can have a portion that is slanted relative to the axial direction. The slanted portion can have a knee in it, for example as illustrated. The cross-section profile can be partially defined by curved surfaces, for example in a location where the surface 204A connects to the respective surfaces 204B and 204D.

Here, a centroid 206 of current density relates to the current distribution in the rotor end ring 200. Similarly, a centroid 208 of current density relates to the current distribution in the stator end turns 104C. In some implementations, one or more aspects of motor geometry can be selected taking into account the axial distances of the centroids from the rotor and the stator, respectively. For example, the rotor end ring geometry can be selected so as to minimize the axial separation between the centroid 206 and the centroid 208.

Figure 3:
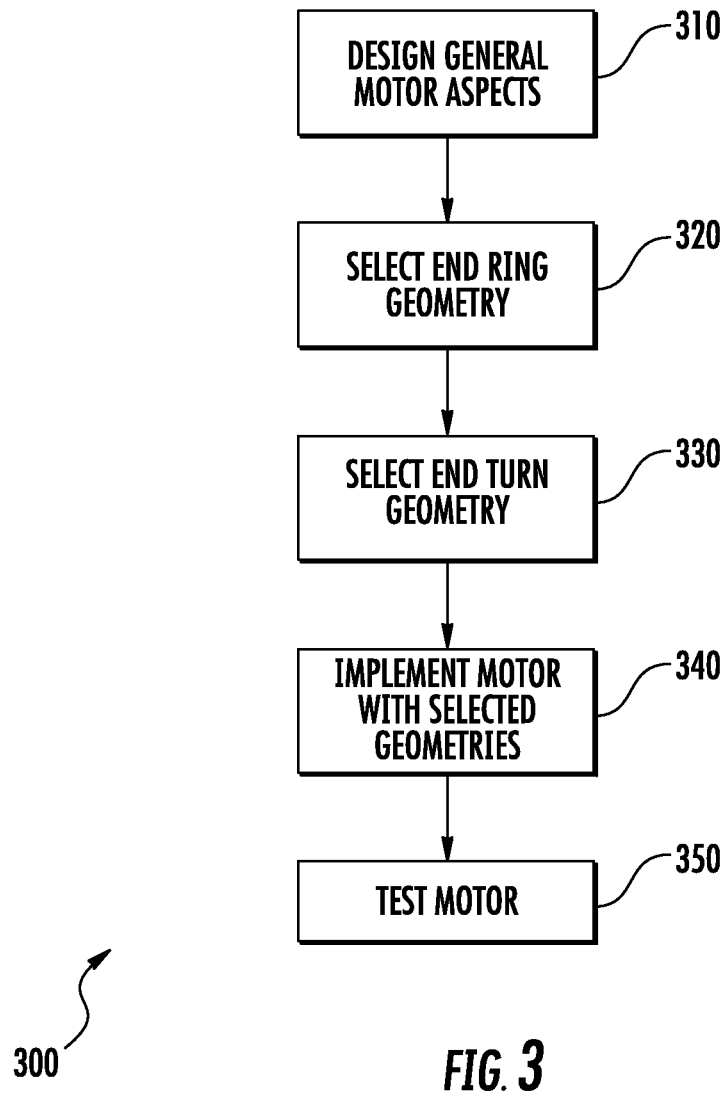
FIG. 3 shows an example of a method of making an electric motor.

FIG. 3 shows an example of a method 300 of making an electric motor. In some implementations, some or all steps can be performed using processor-based equipment, such as a computer system. In some implementations, more or fewer steps can be performed. As another example, one or more steps can be performed in a different order than shown.

At 310, one or more general aspects of the motor are designed. For example, and without limitation, in this step of the design process one can establish the intended use of the motor, its requirements or desired properties, the overall dimensions and shape of the motor (e.g., so that it will fit in an intended environment), the size and shape of the rotor and stator, and the material(s) to use. In some implementations, this step can result in an overall framework being defined to serve as a basis for designing some particular motor components. For example, with reference again briefly to FIG. 1, the step 310 can establish the size and proportions of the entire motor 100 except for the rotor end ring 106C, the containment ring 106D and the stator end turns 104C.

At 320, an end ring geometry is selected. This can be done by evaluating multiple different geometries to select the optimal one. In some implementations, computer models of different end ring cross-section profiles can be created, and each one can be evaluated, with reference to a particular stator end turn profile, in terms of which current density distribution it provides. For example, different sizes and proportions of rectangular end rings (e.g., similar to the end ring 106C in FIG. 1) can be modeled and analyzed. As another example, end rings of other shapes (e.g., grand-piano shaped) can be evaluated. Such analysis can indicate, for example, that a particular end ring geometry produces a current density distribution corresponding to the centroid 112 as shown in FIG. 1.

At 330, an end turn geometry is selected. In some implementations, this involves evaluating different cross-section profiles for the end turns, in analogy with the processing of end ring geometries in step 320. For example, different end turn profiles can be modeled and analyzed in terms of where the centroid of current density is situated. The selection can be made in conjunction with selecting the end ring geometry (e.g., the steps 320-330 can be at least partly parallel, and the geometries can be selected as a pair) or the end turn geometry can be selected separately from the rotor end ring geometry. In some implementations, the stator end turn geometry does not undergo an analysis process similar to the end ring geometry, and instead the end turn geometry more directly results from the general process of designing the remainder of the motor components. For example, this can be done as part of, or in combination with, the designing being done in step 310.

One or more other manufacturing concerns can be taken into account in designing the end ring and/or end turn geometries. For example, in order to bring the end ring current centroid (e.g., the centroid 112 in FIG. 1) closer to the end turn current centroid (e.g., the centroid 114 in FIG. 1) one might try to extend the size of the end ring in the axial direction. However, if the volume of the end ring increases this causes its mass to increase, which may be undesirable from a cost and/or weight perspective. Accordingly, the axial distance between centroids can be minimized within the confines of some design scope or other reference frame that is in turn driven by certain considerations (e.g., cost, weight, performance, to name just a few examples).

At 340, the motor is implemented so that it has the selected geometries and other characteristics. Typically, the components of the motor are manufactured in separate processes and then assembled using conventional techniques. In some implementations, certain components are welded or brazed together, to name just a few examples.

At 350, the motor can be tested. For example, this can involve running the motor (i.e., with the rotor spinning) and/or performing locked-rotor tests with the rotor physically prevented from rotating, where the improvement due to the optimal end-ring shape appears as reduced lumped leakage inductance, which subsequently allows substantially higher torque under voltage constrained conditions (field weakening). In some implementations, the tests can involve measuring certain motor characteristics during the operation or afterwards. For example, characteristics such as speed, torque, energy consumption, durability, noise level and/or operational safety can be measured.

A number of implementations have been described as examples. Nevertheless, other implementations are covered by the following claims.

What is claimed is:

1. A method of making an AC induction motor, the method comprising:
   providing a rotor and a stator for the AC induction motor;
   determining, for different geometries of an end ring of the rotor, a location of a first centroid of current density in the end ring;
   determining, for end turns of the stator, a location of a second centroid of current density in the end turns;
   selecting a geometry for at least the end ring of the rotor so that an axial distance between the first centroid of current density and the second centroid of current density is minimized; and
   assembling the AC induction motor, wherein the end turns and the end ring have the selected geometries.

2. The method of claim 1, wherein selecting the geometries comprises assigning a polygonal cross-section profile to the end ring.

3. The method of claim 2, wherein assigning the polygonal cross-section profile comprises assigning an essentially rectangular cross-section profile.

4. The method of claim 1, wherein selecting the geometries comprises assigning a cross-section profile to the end ring, the cross-section profile partially defined by first and second surfaces that are planar in a radial direction.

5. The method of claim 4, wherein assigning the cross-section profile comprises making the second surface wider in the radial direction than the first surface.

6. The method of claim 5, wherein assigning the cross-section profile comprises placing the second surface adjacent the rotor and placing the first surface opposite the second surface from the rotor.

7. The method of claim 5, wherein the cross-section profile is also partially defined by a third surface that connects the first and second surfaces, the third surface extending in an axial direction and being perpendicular to the first and second surfaces.

8. The method of claim 5, wherein the cross-section profile is also partially defined by a third surface that connects the first and second surfaces, the third surface having a portion that is slanted relative to an axial direction.

9. The method of claim 8, wherein the cross-section profile is also partially defined by curved surfaces on either side of the third surface, each of the curved surfaces connecting the third surface to a respective one of the first and second surfaces.

10. The method of claim 1, wherein a cross-section profile of the end turns is also selected, the selection of the cross-section profile being part of minimizing the axial distance between the first centroid of current density and the second centroid of current density.

\* \* \* \* \*